(12) United States Patent
Newman et al.

(10) Patent No.: US 12,342,830 B2
(45) Date of Patent: Jul. 1, 2025

(54) ONSITE $CO_2$ GENERATION FOR POULTRY STUNNING

(71) Applicant: Messer Industries USA, Inc., Bridgewater, NJ (US)

(72) Inventors: Michael D. Newman, Hillsborough, NJ (US); Christopher T. Ebeling, Far Hills, NJ (US)

(73) Assignee: Messer Industries USA, Inc., Wilmington, DE (US)

( * ) Notice: Subject to any disclaimer, the term of this patent is extended or adjusted under 35 U.S.C. 154(b) by 0 days.

(21) Appl. No.: 18/910,047

(22) Filed: Oct. 9, 2024

(65) Prior Publication Data

US 2025/0024842 A1    Jan. 23, 2025

Related U.S. Application Data

(62) Division of application No. 17/732,583, filed on Apr. 29, 2022.

(60) Provisional application No. 63/183,866, filed on May 4, 2021.

(51) Int. Cl.
*A22B 3/00* (2006.01)
*A22B 3/08* (2006.01)

(52) U.S. Cl.
CPC .............. *A22B 3/005* (2013.01); *A22B 3/086* (2013.01)

(58) Field of Classification Search
CPC ................................ A22B 3/005; A22B 3/086
USPC ........................................................ 452/57
See application file for complete search history.

(56) References Cited

U.S. PATENT DOCUMENTS

| 2,064,822 | A | 12/1936 | Cramer et al. | |
|---|---|---|---|---|
| 2002/0090430 | A1 | 7/2002 | Caracciolo, Jr. | |
| 2008/0051019 | A1* | 2/2008 | Lang | A22B 3/005 |
| | | | | 452/66 |
| 2015/0157031 | A1 | 6/2015 | Wigfall | |
| 2015/0282440 | A1 | 10/2015 | Shelor | |
| 2015/0354451 | A1 | 12/2015 | Harper, Jr. | |
| 2017/0013847 | A1* | 1/2017 | van den Bos | A22B 1/00 |
| 2017/0341942 | A1* | 11/2017 | Harper, Jr. | F01K 7/16 |

FOREIGN PATENT DOCUMENTS

| DE | 243422 A1 | 3/1987 |
|---|---|---|
| DE | 3614387 A1 | 10/1987 |
| EP | 2130426 A2 | 12/2009 |
| JP | 2009203860 A | 9/2009 |
| WO | 94/27425 | 12/1994 |

(Continued)

OTHER PUBLICATIONS

PCT International Search Report from ISA/US for PCT/US2022/027239, filed May 2, 2022, Date of Mailing: Jul. 26, 2022, Authorized Officer: Taina Matos, 8 pgs.

(Continued)

*Primary Examiner* — Richard T Price, Jr.
(74) *Attorney, Agent, or Firm* — Joshua L. Cohen

(57) ABSTRACT

An apparatus for stunning an animal with an exhaust gas mixture includes a stunning chamber located at a processing site to contain therein as many an animal selected to be stunned; and a combustion chamber located at the processing site for combusting a mixture to provide therefrom an exhaust gas mixture which includes carbon dioxide for stunning the animal in the stunning chamber.

13 Claims, 2 Drawing Sheets

(56) References Cited

FOREIGN PATENT DOCUMENTS

| WO | 2008128027 | A1 | 10/2008 |
| WO | 2019180241 | A1 | 9/2019 |
| WO | 2022070125 | A1 | 4/2022 |
| WO | 2024032992 | A1 | 2/2024 |

OTHER PUBLICATIONS

PCT Written Opinion from ISA/US for PCT/US2022/027239, filed May 2, 2022, Date of Mailing: Jul. 26, 2022, Authorized Officer: Taina Matos, 7 pgs.
PCT International Preliminary Report on Patentability for PCT/US2022/027239, filed May 2, 2022, Date of Mailing: Nov. 16, 2023, Authorized Officer: Simin Baharlou, 9 pgs.
PCT International Search Report for PCT/US2023/074724, filed Sep. 21, 2023, Date of Mailing: Feb. 16, 2024, Authorized Officer: Shane Thomas, 11 pgs.
PCT Written Opinion for PCT/US2023/074724, filed Sep. 21, 2023, Date of Mailing: Feb. 16, 2024, Authorized Officer: Shane Thomas, 6 pgs.
European Search Report from European Patent Office for European Application No. 22799351.6, dated Mar. 20, 2025, 12 pgs.

* cited by examiner

US 12,342,830 B2

ONSITE CO₂ GENERATION FOR POULTRY STUNNING

BACKGROUND OF THE INVENTION

The present invention relates to the field of stunning animals for food processing and in particular, to apparatus and methods for stunning animals, such as poultry for example, with industrial gases.

Stunning of animals, such as for example poultry, requires an atmosphere consisting of carbon dioxide ($CO_2$), nitrogen ($N_2$) and oxygen ($O_2$). The terms "carbon dioxide" and "$CO_2$"; "nitrogen" and "$N_2$"; and "oxygen" and "$O_2$" are used interchangeably herein. The term "stunned" or "stunning" as used in the animal food processing industry and as used herein means the process of rendering animals unconscious before slaughtering the animals for food. The stunning process renders the animals, such as poultry, insensitive to discomfort and pain. Stunning of poultry for example requires high concentrations of $CO_2$ prior to slaughtering the birds for subsequent processing. Poultry stunning and equipment used to stun poultry are known in the industry.

Historically, the supply of industrial gases to poultry stunning systems has been provided with onsite industrial bulk gas storage tanks (carbon dioxide, nitrogen and oxygen). The term "onsite" and "bulk" as used herein means a large tank, container or vessel disposed or installed at a processor's facility or site, and which is filled with the respective liquid from a tanker truck delivering the liquid to the onsite tank during scheduled deliveries or as needed on an emergency basis to accommodate increased demand at the stunning site. For the majority of applications, the bulk tank contains a liquid. The bulk tank will then deliver the liquid through a pipeline or other intermediate process whereupon the liquid phase changes to a gas to be used in the stunning chamber. The gases are mixed in different concentrations to result in the pre-determined stunning gas mixture. The stunning gas mixture selected is that which will minimize stress to the animal and therefore, increase both the yield and quality of the meat harvested from animal during subsequent processing.

As stunning is the first necessary step or one of the earlier steps in poultry processing, a continuous, reliable supply of carbon dioxide is essential for the onsite stunning process. If the supply of carbon dioxide is interrupted for the stunning process, the poultry facility's production must be stopped, which results in detrimental financial impact to the poultry (food) processor. Known stunning site operators have their onsite bulk storage tanks currently supplied by bulk carbon dioxide tanker trucks making scheduled deliveries. Unfortunately, $CO_2$ poses the greatest risk of interruption among all the gases used for the stunning gas mixture. This is because $CO_2$ is obtained from feed gas steams which originate at feed gas suppliers such as for example refineries, ethanol plants, etc. And, the feed gas suppliers are governed by feed gas contracts which allow for outages and/or disruptions of the feed gas stream due to plant maintenance, shutdowns, outages, idling and turnarounds, from which the $CO_2$ is obtained. In effect, the supplier and therefore the operator of a gas stunning site has little if any control over the delivery of a continuous supply of $CO_2$, as compared to the delivery of oxygen and nitrogen, which gases are taken from air. Thus, a reliable supply of $CO_2$ for the stunning gas mixture used in the related process is more vulnerable to disruptions than that of oxygen and nitrogen.

Referring to FIG. 1, known stunning facilities susceptible to the above described $CO_2$ outages or disruptions use a stunning system having a stunning chamber 100 for animals 102 such as for example poultry (chickens, etc.). Quantities or molecules of $O_2$, $N_2$ and $CO_2$ are delivered in liquid bulk to the stunning facility at which the stunning chamber 100 is used. A tanker truck (not shown) for each of liquid oxygen (LOX), liquid nitrogen (LIN) and liquid carbon dioxide (LCO₂) delivers each respective liquid product to a corresponding bulk tank 104 (bulk liquid $O_2$), 106 (bulk liquid $N_2$), 108 (bulk liquid $CO_2$) located on the property of the stunning facility. Each one of the bulk tanks 104,106,108 has a corresponding outlet and a corresponding pipeline 104', 106',108' connecting a respective one of the bulk tanks to an inlet of a corresponding vaporizer 114,116,118. Each one of the vaporizers 114,116,118 has an outlet connected to a corresponding pipeline 114',116',118'; each one of the pipelines connected to a corresponding inlet of a mixing system 110 or skid. The bulk tanks 104,106,108 are pressurized thereby providing a tank head pressure in each tank in order to force the corresponding bulk liquid from the tanks for delivery to each respective one of the vaporizers 114,116, 118, preferably in a controlled, continuous manner as the operation requires. The vaporizers 114,116,118 receive the bulk liquids and vaporize same, i.e. the bulk liquids each change from liquid to gaseous phase to facilitate mixing of the gases downstream at the mixing system 110 or skid.

At the skid 110, a gaseous proportion of each bulk liquid from the tanks 104,106,108 is mixed for subsequent delivery through another pipeline 110' to and in communication with the stunning chamber 100. The flow of liquid departing from each bulk tank 104,106,108 is preferably under pressure, although other manner of delivery of the bulk liquid from the tanks 104,106,108 can be employed.

The mixing system 110 provides a gas stunning mixture 112 to the stunning chamber 100. The three gases have been mixed in various concentrations at the skid 110 to provide a select gas stunning mixture 112 so that same will optimize quality and yield of the carcasses during the stunning and subsequent processing. The type and number of animals to be stunned in the chamber 100 will determine the specific proportions or concentrations of each gas to be used in the gas stunning mixture 112. It is possible that the subsequent process for the animals being stunned will also determine the proportions or concentrations of each gas to be used in the gas stunning mixture 112.

As is apparent from the known stunning system in FIG. 1, the stunning system is contingent upon a reliable supply of $CO_2$ to stun the poultry for subsequent processing. The $CO_2$ gas is the primary or most important gas for the stunning gas mixture 112. However, $CO_2$ outages, disruptions, and/or any other possible force majeure circumstance can adversely impact the reliable delivery of the liquid $CO_2$ to the bulk storage tank 108 for producing the $CO_2$ gas to be used in the stunning gas mixture 112 of the stunning system.

Therefore, an alternative to relying upon a bulk liquid $CO_2$ delivery from off-site is needed so that there can be generated "on-demand $CO_2$" for stunning which would eliminate the disadvantages a food processor is subjected to as described above.

SUMMARY OF THE INVENTION

The inventive embodiments provide a flue gas or an exhaust gas mixture as a stunning gas mixture from an oxyfuel combustion process located on-site at the processor's site or facility to supply carbon dioxide ($CO_2$) and other gases needed in a stunning system for animals such as for example poultry. The oxyfuel combustion apparatus and relate method are located at the same processing site or facility as that of the stunning system. A supply of natural gas or propane which is already present at the processing site, and gaseous oxygen from a bulk liquid tank, more reliably available than $CO_2$, would be delivered to an oxyfuel burner of the combustion process. Reference herein to natural gas also includes propane. Combustion of the gaseous oxygen, air and natural gas at the oxyfuel burner will result in a flue gas consisting of $CO_2$, nitrogen ($N_2$), oxygen ($O_2$) and water ($H_2O$). Combustion of the natural gas with oxygen and air at an air-oxyfuel burner capable of different oxidizer amounts will also result in a flue gas consisting of $CO_2$, nitrogen ($N_2$), oxygen ($O_2$) and water ($H_2O$). In the case where the combustion gas or oxidizer for the burner is 100% oxygen, the resulting flue gas could contain as much as 90% $CO_2$. The oxygen and natural gas (or propane) are more readily and reliably available and would significantly reduce the risk of supply disruptions because the $CO_2$ is created on site and on demand.

There is provided herein an apparatus for stunning an animal with an exhaust gas mixture, which includes a stunning chamber located at a processing site to contain therein as many an animal selected to be stunned; and a combustion chamber located at the processing site for combusting a mixture of gases to provide therefrom an exhaust gas mixture comprising carbon dioxide for stunning the animal in the stunning chamber.

In certain embodiments the apparatus further includes a flow skid located at the processing site upstream from and in fluid communication with the combustion chamber for receiving gaseous oxygen, air, and natural gas or propane for providing a proportion of each of the gaseous oxygen, air, and natural gas or propane for the combustion mixture to be provided to the combustion chamber.

In certain embodiments the apparatus further includes a heat exchanger located at the processing site downstream from the combustion chamber to receive and cool the exhaust gas mixture before the exhaust gas mixture is delivered to the stunning chamber.

In certain embodiments the apparatus further includes a condenser located at the processing site downstream from and in fluid communication with the heat exchanger for receiving and drying the exhaust gas mixture; and a filter located at the processing site downstream from and in fluid communication with the condenser for receiving dried exhaust gas mixture and filtering particulate matter from the dried exhaust gas mixture.

In certain embodiments the apparatus further includes a compressor or a blower located at the processing site downstream from and in fluid communication with the heat exchanger to receive the exhaust gas mixture for delivery to the stunning chamber.

In certain embodiments the exhaust gas mixture further includes nitrogen and oxygen.

In certain embodiments the gaseous oxygen, the air, and the natural gas are available from the processing site, or instead of natural gas propane is available from the processing site.

In certain embodiments the combustion chamber further includes an oxyfuel burner or an air-oxyfuel burner for the combusting the mixture of gases.

In certain embodiments the apparatus further includes a boiler located at the processing site for being contacted by the exhaust gas mixture from the combustion chamber; and a heat exchanger located at the processing site for receiving at least a portion of the exhaust gas mixture, the heat exchanger constructed and arranged to return cooled exhaust gas mixture for delivery to the stunning chamber.

In certain embodiments the heat exchanger includes a cooling tower.

In certain embodiments a percentage of the carbon dioxide in the exhaust gas mixture is in a range of from 11% to 90%.

In certain embodiments the animal selected is poultry, chickens, turkeys or pigs.

There is also provided herein a method for stunning an animal with an exhaust gas mixture, which includes delivering an exhaust gas mixture consisting of carbon dioxide from a combustion chamber located at a processing site to a stunning chamber located at the processing site for any amount of a select type of animal; and contacting the select type of animal with the exhaust gas mixture in the stunning chamber for stunning the select type of animal.

In certain embodiments the method further includes providing air to the combustion chamber.

In certain embodiments the method further includes providing natural gas to the combustion chamber or instead of natural gas providing propane to the combustion chamber.

In certain embodiments the method further includes providing air and natural gas from the processing site to the combustion chamber.

In certain embodiments the exhaust gas mixture further includes nitrogen and oxygen.

In certain embodiments the method further includes cooling the exhaust gas mixture before delivering the exhaust gas mixture to the stunning chamber.

In certain embodiments the method further includes filtering the exhaust gas mixture of particulate matter before delivering the exhaust gas mixture to the stunning chamber.

In certain embodiments the method further includes contacting a boiler with the exhaust gas mixture from the combustion chamber for providing steam.

In certain embodiments the method further includes combining gaseous oxygen, air, and natural gas or propane into a combustion mixture upstream from the combustion chamber; and providing the combustion mixture to be combusted in the combustion chamber for providing the exhaust gas mixture.

In certain embodiments a percentage of the carbon dioxide in the exhaust gas mixture is in a range of from 11% to 90%.

In certain embodiments the select type of animal is poultry.

There is also provided herein an exhaust gas mixture for stunning an animal, which includes a mixture of gases combusted at a processing site for producing an exhaust gas mixture comprising carbon dioxide for stunning an animal at the processing site.

In certain embodiments of the exhaust gas mixture the animal is poultry, chickens, turkeys or pigs.

In certain embodiments the exhaust gas mixture further comprises nitrogen and oxygen.

In certain embodiments of the exhaust gas mixture a percentage of the carbon dioxide in the exhaust gas mixture is in the range of from 11% to 90%.

BRIEF DESCRIPTION OF THE DRAWINGS

For a more complete understanding of the present invention, reference may be had to the detailed description of the inventive embodiments taken in conjunction with the following drawings, of which.

DETAILED DESCRIPTION

Before explaining the inventive embodiments in detail, it is to be understood that the invention is not limited in its application to the details of construction and arrangement of parts illustrated in the accompanying drawings, if any, since the invention is capable of other embodiments and being practiced or carried out in various ways. Also, it is to be understood that the phraseology or terminology employed herein is for the purpose of description and not of limitation.

In the following description, terms such as a horizontal, upright, vertical, above, below, beneath and the like, are to be used solely for the purpose of clarity illustrating the invention and should not be taken as words of limitation. The drawings are for the purpose of illustrating the inventive embodiments and are not intended to be to scale.

Figure 1:
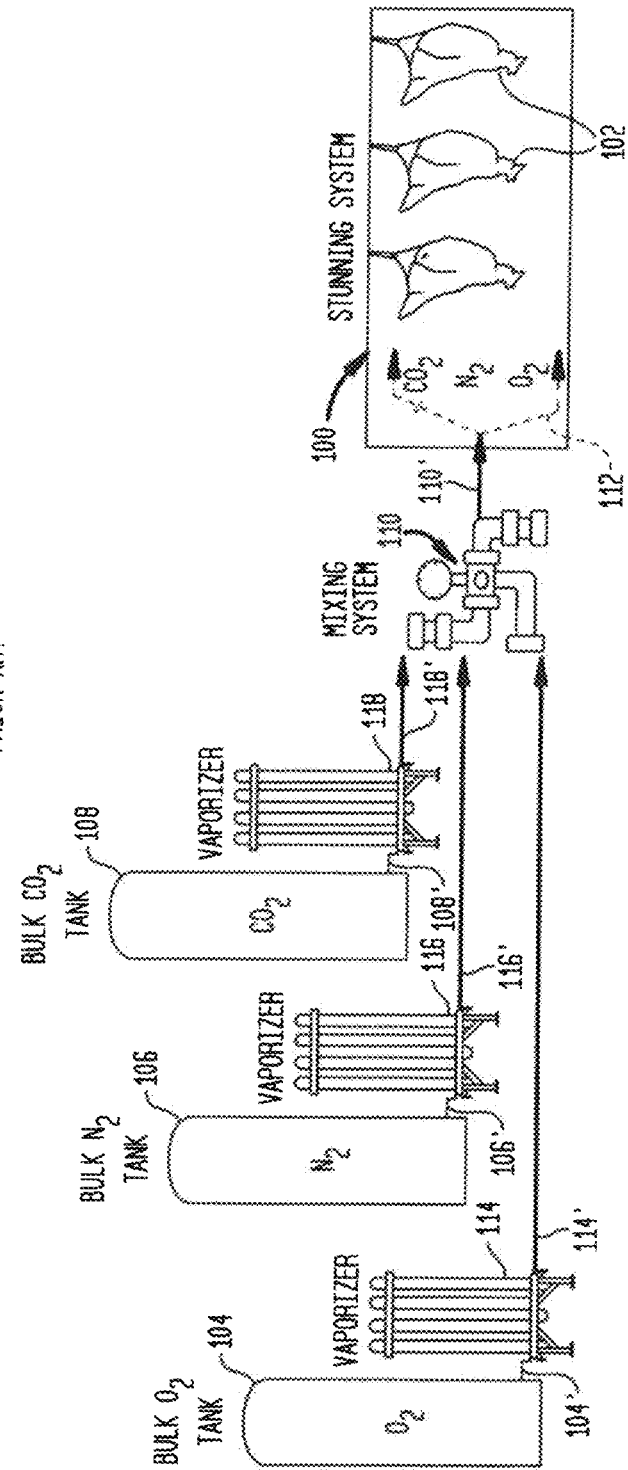
FIG. 1 shows a known stunning system for poultry and the tanks of bulk liquid product used in the stunning system.
Figure 2:
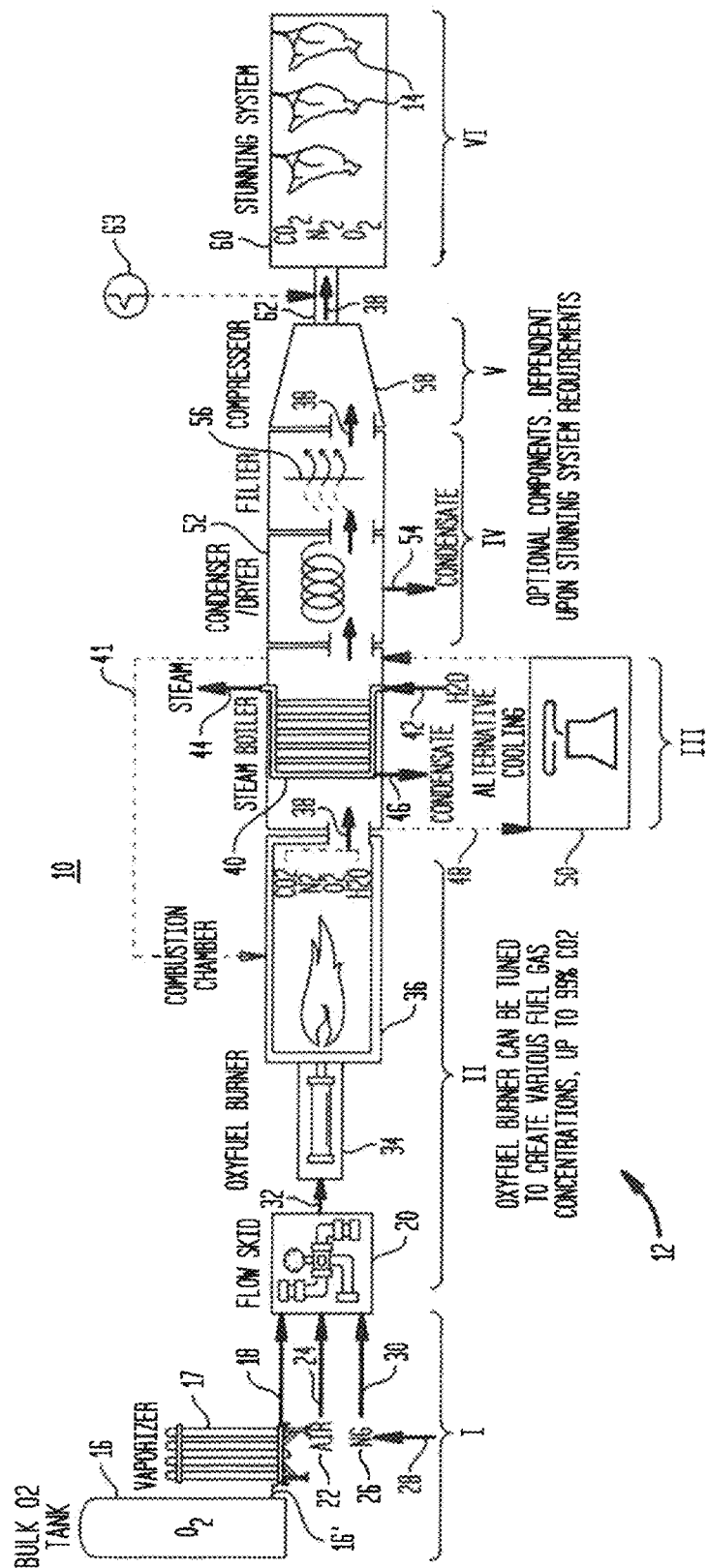
FIG. 2 shows a stunning system and related method according to the inventive embodiments of the present invention.

Referring generally to FIG. 2, a food processor has a processing site 10, plant or facility at which is located apparatus 12 and method embodiments for, among other things, stunning poultry 14. The site 10 functions as follows for use for example as a poultry processing plant. In the plant, the poultry 14 are chickens, turkeys or other fowl by way of example only, and such animals must be stunned in the plant before further processing is to occur to the carcasses. Other types of animals can be stunned as well such as, for example, pigs to product pork products.

In general, a mixture of pure oxygen ($O_2$), natural gas (NG) or propane, and for some applications air, will be fed into, for example, an oxyfuel burner or an air-oxyfuel burner ("burner"). The NG, or propane if used, is already available on-site at the plant, as the plant uses the NG (or propane) for other plant operations including providing heat for the plant and boilers for steam to process the poultry carcasses. The burner fires into a combustion chamber to heat same. During the combustion process, carbon dioxide ($CO_2$), nitrogen ($N_2$) and oxygen ($O_2$) are produced, in addition to heat and water vapor. This mixture is the flue gas or the exhaust gas from combustion and is used as the stunning gas mixture for the poultry 14.

The exhaust gas can be, among other things, cooled before being used as the stunning gas mixture, after which a portion of the water vapor in the flue gas must be removed or stripped therefrom prior to the stunning gas being introduced into the stunning process.

A steam boiler is therefore included in the apparatus to remove heat from the exhaust gas. The steam boiler receives the exhaust gas and includes a heat exchanger through which water flows to be heated by the exhaust gas. The water in the heat exchanger is heated to thereby produce condensate and steam for use elsewhere or at remote locations in the processing plant.

The steam can also be used to power a turbine (not shown) to create electricity for the plant and the stunning apparatus and process. The heat can also be dissipated into the atmosphere by connecting a circulation loop to a cooling tower or with a fresh water supply (e.g., from a river). Once a large portion of the heat is removed from the exhaust gas, the exhaust gas can be cooled further to condense excess water vapor from same or dried by a condenser prior to the exhaust gas being used for stunning process.

As mentioned above, stunning processes require some mixture of $CO_2$, nitrogen and oxygen. The present embodiments enable the ability to change the inlet oxygen:air ratio of combustion gas so that a greater or lesser amount of each of $CO_2$, nitrogen and oxygen can be present in the exhaust gas mixture used in the stunning apparatus and method embodiments.

Referring with more specificity to FIG. 2, there are a plurality of stages I-VI available in the present embodiments. The stages are described to facilitate an orderly recitation of same and understanding about the elements in the stages and the related coaction of the elements for the stunning apparatus and method embodiments. Recitation of the stages is not meant to describe or limit an order of precedence for carrying out the stages or the elements thereof. The stages I-VI of the apparatus 12 and related method embodiments are all located at the processing site 10 to stun poultry 14. The stages I-VI and related components and steps in same may be described herein as being upstream or downstream with respect to each other.

Stage I includes a bulk storage tank 16 for holding liquid oxygen (LOX). The tank 16 is pressurized to forcibly deliver the LOX from an outlet proximate a lower region of the tank into a pipeline 16' connected to an inlet of a vaporizer 17. The LOX is converted or vaporized into a gas phase at the vaporizer 17 and thereafter delivered as gaseous oxygen from an outlet of the vaporizer into a pipe 18 connected to an inlet of a fluid mixer 20 (also known in the food processing and industrial gas industries as a mixing or flow skid 20). Air 22 is also available to be delivered in a pipe 24 connected to an inlet of the skid 20. Natural gas (NG) 26, or alternatively propane, is sourced from a location 28 at the processing site 10 for delivery through a pipe 30 to an inlet of the skid 20. In effect, all gases or constituents necessary for providing the resulting stunning gas mixture are obtained from the processing site 10. The flow skid 20 meters or apportions a select quantity of each gaseous flow of oxygen, air and NG into the combustion stage of the inventive embodiments.

Stage II includes the flow skid 20, wherein a proportion or concentration of each of the gaseous $O_2$, air and NG introduced into the skid is apportioned to be injected for subsequent heating and combustion. The oxygen will begin to warm and expand to a gas phase while passing through the vaporizer 17. A combustion mixture from an outlet of the skid 20 is delivered by a pipe 32 to a burner 34, such as an oxyfuel burner or an air-oxyfuel burner, of a combustion chamber 36 in a furnace located at the processing site 10. Alternatively, the apparatus 12 can include a plurality of the pipes 32, one pipe each for the gaseous oxygen, air and NG being delivered to the burner 34 where the gases are mixed for combustion. Combustion of the gaseous mixture in the chamber 36 will provide a heated exhaust gas mixture 38 of $CO_2$, $N_2$, $O_2$ and $H_2O$. The heated exhaust gas mixture 38 can be further conditioned or processed to provide an exhaust gas mixture used for stunning the poultry 14, without having to rely upon a separate $CO_2$ delivery, bulk or otherwise, from a remote location for the stunning process of the poultry 14.

Stage III includes a steam boiler 40 contacted by the exhaust gas mixture 38 from the combustion chamber 36, wherein water ($H_2O$) 42 introduced into the boiler 40 produces a stream of steam 44 and condensate 46. Alternative cooling of the exhaust gas mixture 38 in stage III can include a closed loop 48 for the exhaust gas mixture through a cooling tower 50 or other type heat exchanger.

Stage IV includes that which can be optionally used for the exhaust gas mixture 38, depending upon the stunning system requirements. The exhaust gas mixture 38 can be dried in a condenser 52 for removal of $H_2O$ from the exhaust gas mixture through a condensate pipe 54. A filter 56 positioned downstream from the condenser 52 is used to remove any contaminants and/or particulate matter from the exhaust gas mixture 38 prior to its contact with the poultry 14.

Stage V includes a compressor 58 or blower to pressurize and forcibly deliver the exhaust gas mixture 38 to stage VI.

Stage VI includes the stunning chamber 60 in which the exhaust gas mixture 38 with reduced water content therein is introduced to contact and stun the poultry 14. The mixture includes proportions of $CO_2$, $N_2$ and $O_2$. A pipeline 62 or conduit having an internal diameter less than an internal volume of the compressor 58 may connect an outlet of the compressor with an inlet to the stunning chamber 60.

Stage I would be upstream of stage II; stage II would be upstream of stage III; stage III would be upstream of stage V; and stage V would be upstream of stage VI. If stage IV is used, stage IV is positioned between stages III and V, i.e. stage IV is downstream of stage III and upstream of stage V. However, it is not necessary to use the stage IV components and steps for the inventive embodiments.

Example I

Using the apparatus 12 of the present embodiments, in stages I and II mixing 90% oxygen and 10% air with natural gas will produce an exhaust gas mixture 38 of 53% $CO_2$, 5% $O_2$ and 42% $N_2$ for stunning the poultry 14.

Example II

Using the apparatus 12 of the present embodiments, in stages I and II mixing 100% oxygen only with natural gas (NG) will produce an exhaust gas mixture 38 of 90% $CO_2$, 9% $O_2$ and 1% $N_2$ for stunning the poultry 14.

A percentage of the carbon dioxide in the exhaust gas mixture can be in a range of from 11% to 90%, and for certain apparatus and method embodiments the carbon dioxide in the exhaust gas mixture can be in a range of from 11% to 99%.

Still referring to FIG. 2, additional apparatus and method embodiments may include a pipeline 41 to interconnect a downstream region of the boiler 40 with the combustion chamber 36 to provide a cooling fluid to cool the combustion chamber; the cooling to be of an interior of the chamber and/or an exterior sidewall of the combustion chamber. Another heat exchanger 63, such as for example an air-cooled heat exchanger, may also be positioned between the compressor 58 and the stunning chamber 60 by being in fluid communication with the exhaust gas mixture 38 to cool and reduce the temperature of the mixture before it is introduced into the stunning chamber. Still another embodiment provides for the compressor 58 to instead be positioned downstream of the boiler 40 and upstream of the condenser/dryer 52.

The present apparatus and method embodiments enable a processor to precisely adjust inlet gas ratios to match requirements necessary for the specific stunning process for a specific animal. The only bulk delivery requirement for the present embodiments is a single bulk liquid oxygen supply, eliminating the need for a plurality of bulk storage tanks at the site 10.

Advantages of the present embodiments include eliminating the inconvenience and risk of $CO_2$ supply disruptions; providing on-demand $CO_2$ supply for the stunning at the processing site 10; the ability to create select mixtures of $CO_2$, $O_2$ and $N_2$ for stunning by varying the oxygen and air inlet ratios; and providing a heat source from the exhaust gas mixture 38 for the processing facility.

It will be understood that the embodiments described herein are merely exemplary, and that one skilled in the art may make variations and modifications without departing from the spirit and scope of the invention. All such variations and modifications are intended to be included within the scope of the invention as described hereinabove and called for in the present claims. Further, all embodiments disclosed are not necessarily in the alternative, as various embodiments may be combined to provide the desired result.

What is claimed is:

1. An apparatus for stunning an animal with an exhaust gas mixture, comprising:
    a stunning chamber located at a processing site to contain therein as many an animal selected to be stunned;
    a combustion chamber located at the processing site for combusting a mixture of gases to provide therefrom an exhaust gas mixture comprising carbon dioxide for stunning the animal in the stunning chamber;
    a flow skid located at the processing site upstream from and in fluid communication with the combustion chamber for receiving gaseous oxygen, air, natural gas or propane for providing a proportion of each of the gaseous oxygen, air, and natural gas or propane for the combustion mixture to be provided to the combustion chamber;
    a heat exchanger located at the processing site downstream from the combustion chamber to receive and cool the exhaust gas mixture before the exhaust gas mixture is delivered to the stunning chamber; and
    a compressor or a blower located at the processing site downstream from and in fluid communication with the heat exchanger to receive the exhaust gas mixture for delivery to the stunning chamber.

2. The apparatus of claim 1, further comprising:
    a condenser located at the processing site downstream from and in fluid communication with the heat exchanger for receiving and drying the exhaust gas mixture; and
    a filter located at the processing site downstream from and in fluid communication with the condenser for receiving dried exhaust gas mixture and filtering particulate matter from the dried exhaust gas mixture.

3. The apparatus of claim 1, wherein the gaseous oxygen, the air, the natural gas and the propane are available from the processing site.

4. The apparatus of claim 1, wherein a percentage of the carbon dioxide in the exhaust gas mixture is in a range of from 11% to 99%.

5. The apparatus of claim 1, wherein the animal is selected from the group consisting of poultry, chickens, turkeys and pigs.

6. An apparatus for stunning an animal with an exhaust gas mixture, comprising:
    a stunning chamber located at a processing site, wherein the stunning chamber can contain therein as many an animal selected to be stunned; and
    a combustion chamber located at the processing site for combusting a mixture of gases to provide therefrom an exhaust gas mixture comprising carbon dioxide at the processing site for stunning the as many an animal selected in the stunning chamber, wherein the stunning chamber and the combustion chamber located at the processing site are adapted to not rely upon a separate carbon dioxide delivery from a location remote from the processing site for the stunning.

7. The apparatus of claim 6, further comprising a flow skid located at the processing site upstream from and in fluid communication with the combustion chamber for receiving gaseous oxygen, air, natural gas or propane for providing a proportion of each of the gaseous oxygen, air, and natural gas or propane for the combustion mixture to be provided to the combustion chamber.

8. The apparatus of claim 7, further comprising a heat exchanger located at the processing site downstream from the combustion chamber to receive and cool the exhaust gas mixture before the exhaust gas mixture is delivered to the stunning chamber.

9. The apparatus of claim 8, further comprising:
a condenser located at the processing site downstream from and in fluid communication with the heat exchanger for receiving and drying the exhaust gas mixture; and
a filter located at the processing site downstream from and in fluid communication with the condenser for receiving dried exhaust gas mixture and filtering particulate matter from the dried exhaust gas mixture.

10. The apparatus of claim 9, further comprising a compressor or a blower located at the processing site downstream from and in fluid communication with the heat exchanger to receive the exhaust gas mixture for delivery to the stunning chamber.

11. The apparatus of claim 7, wherein the gaseous oxygen, the air, the natural gas and the propane are available from the processing site.

12. The apparatus of claim 6, wherein a percentage of the carbon dioxide in the exhaust gas mixture is in a range of from 11% to 99%.

13. The apparatus of claim 6, wherein the animal is selected from the group consisting of poultry, chickens, turkeys and pigs.

* * * * *